United States Patent Office 3,324,591
Patented June 13, 1967

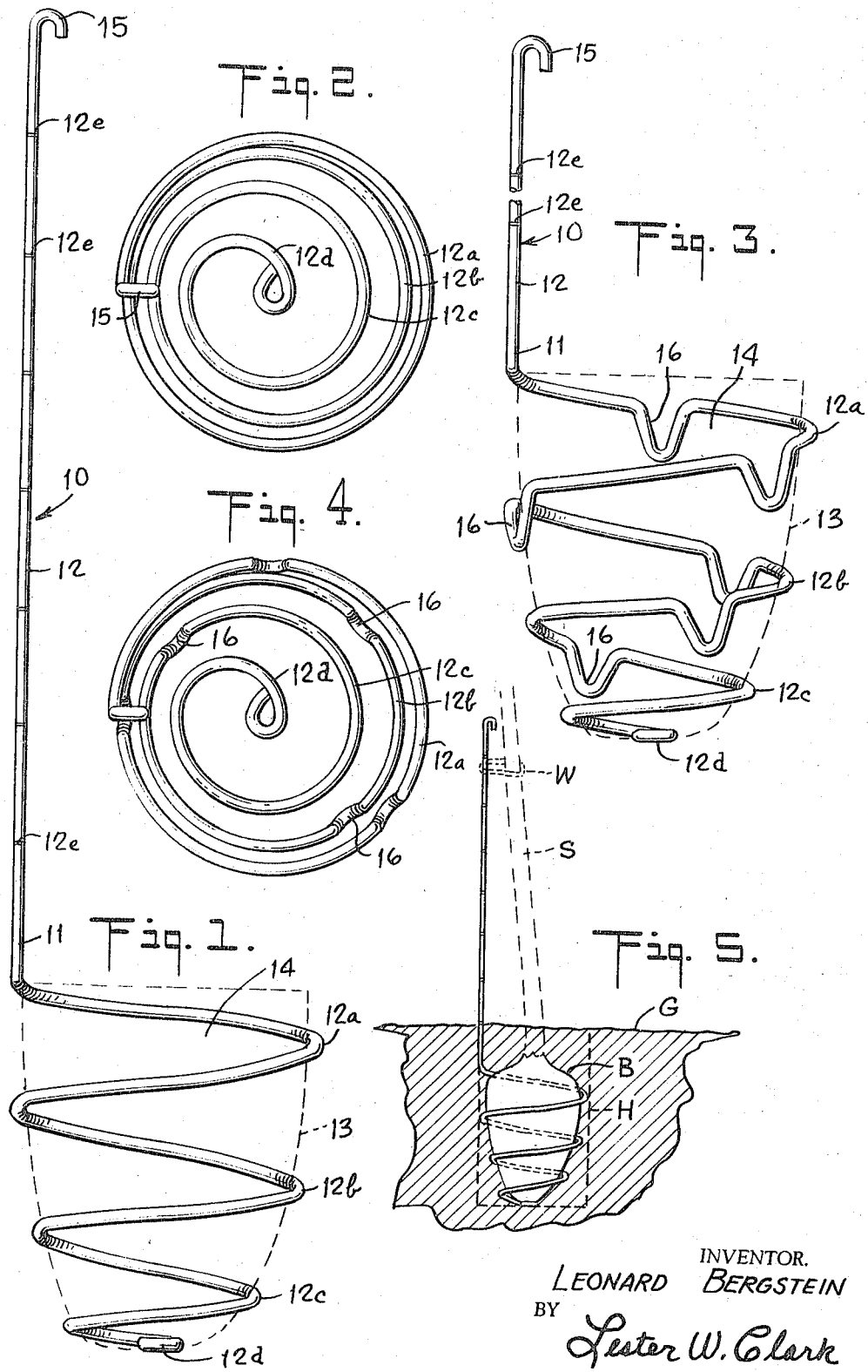

3,324,591
GARDENING DEVICE
Leonard Bergstein, 70 Stephen Marc Lane,
New Hyde Park, N.Y. 11040
Filed Aug. 5, 1965, Ser. No. 477,369
6 Claims. (Cl. 47—37)

This invention relates to gardening devices, and more particularly relates to a device useful for planting, protecting, locating, and removing plant bulbs from the soil.

There are many perennial plants which grow from bulbs and corms. For convenience, the generic term "bulbs" will be understood as indicating the plant body from which such plants grow, regardless of whether such bodies are generally classified as bulbs, corms, tubers or rhizomes.

The gardener employs such bulbs by burying them in the earth, and allowing them to grow and flower for decorative or other purposes. When the foliage has withered and died, such bulbs are dug up and stored for later replanting during a subsequent growing season.

When attempting to employ bulbs in the manner just described, the gardener encounters a number of problems which increase the difficulty of properly setting out and recovering the bulbs from season to season. The initial difficulties relate to setting out the bulbs. The gardener first digs one or more holes, into which he then places a corresponding number of bulbs. However, it is difficult to set all the bulbs to the same depth, even if the holes are dug to the same depth, because loose earth may fall into the holes and because the tamping characteristics of the earth surrounding the holes may vary. Moreover the bulbs must be set into the bottom of the holes with their tops vertically oriented and pointing out of the hole, so that all the bulbs will grow uniformly and correctly. This is difficult in practice, because the holes should be as small in diameter as possible, which prevents manual placement, and because bulbs tilt easily, even on a flat surface.

The final difficulties relate to recovering the bulbs at the end of growing season. At that time all the foliage grown from the bulb has died and withered away, and it is often difficult to locate the bulbs. When a spade or the like is employed to locate the buried bulbs they are often cut or otherwise damaged. Even when located without damage, such buried bulbs are difficult to retrieve from the ground conveniently. When a number of different kinds of bulbs (i.e. corresponding to different kinds of plants) are set out in a bed, and after the foliage has died and withered away, it is sometimes difficult to identify the buried bulbs even after they are found.

What has been needed is a gardening device capable of closely retaining the bulb before, during, and after burial in the ground in order to overcome the aforesaid problems. But additionally, such a gardening device should be capable of expanding with the growth of the bulb. This is extremely important because close retention is necessary to correctly set out the bulbs, as will be hereinafter explained, and yet close retention has heretofore caused distortion, damage, and stunting of the bulb during its subsequent underground growth.

Additionally, such a gardening device should locate each bulb within its corresponding earthen hole at the correct depth and correctly oriented upward. Additionally, such a gardening device should remain partially underground and aboveground so as to mark the location and identity of the bulb as well as to protect the bulb against spade-work therearound.

Finally, such a gardening device should be useful for retrieving the bulb from the ground when it is to be harvested, and for storing it if desired.

It is an object of the invention to provide an improved gardening device for setting out, retaining, and retrieving bulbs relative to the earth.

Another object of the invention is to provide such a gardening device wherein the bulb is closely retained throughout the period of time while it is growing in the earth, as well as during the setting out and retrieving periods, and despite intervening growth of the bulb.

Another object of the invention is to provide such a gardening device wherein close retention of the bulb during all periods is achieved without injury to or stunting of the bulb.

Another object of the invention is to provide such a gardening device adapted to simplify and speed the various steps associated with planting and retrieving bulbs from the earth.

These and other objects of the invention will be more fully appreciated as the detailed description of the presently preferred but merely illustrative embodiments of the invention are described in detail hereinafter, in connection with the drawings, wherein:

FIG. 1 is an elevational view of a first embodiment of a gardening device according to the invention;

FIG. 2 is a plan view of the gardening device shown in FIG. 1;

FIG. 3 is an elevational view of a second embodiment of a gardening device according to the invention;

FIG. 4 is a plan view of the gardening device according to FIG. 3; and

FIG. 5 is an elevation view of a gardening device according to the invention buried in the earth and cradling a bulb.

Briefly stated, a gardening device according to the invention comprises an upstanding portion adapted to act as a handle and as a marker, and a receptacle portion generally shaped to include and closely retain a bulb. The receptacle portion is located at the lower end of the upstanding portion and includes discontinuous walls which define the outer envelope thereof, which walls are resiliently movable in all directions, allowing increase of the volume included within the receptacle portion by expansion of the envelope in any direction, thereby accommodating growth of the closely retained bulb.

Referring now to the figures, the first and preferred embodiment of the invention (FIGS. 1 and 2) comprises a gardening device indicated generally at 10, formed from a single and continuous length of relatively stiff material having resilient characteristics, such as enamelled iron wire. Other metals, plastics, and other materials having the foregoing characteristics may be substituted for iron. The wire 11 is formed into an upstanding portion 12 which preferably is straight in outline, the upstanding portion 12 being surmounted by a hook 15 formed as a curved portion of portion 12. Hook 15 may be employed to store the gardening device 10 during periods of non-use, or may be employed to retrieve the gardening device 10 from partial burial in the earth, by means of the insertion of tools under hook 15 for upward pressure thereon.

The wire 11 is further formed into a receptacle portion defined by a spiral helix having three major turns 12a, 12b, 12c, constituting the side walls, and a minor turn 12d, constituting the bottom. As is characteristic of a spiral helix, the various successive turns along the length of wire 11 proceeding downwardly from upstanding portion 12 have a diminishing radius of curvature (FIG. 2), and a relatively constant pitch, i.e., a relatively constant rate of descent away from upstanding portion 12. The various turns 12a, 12b, 12c, 12d define discontinuous walls mutually defining an envelope 13, indicated in broken lines in FIG. 1, which envelope 13 encompasses a volume 14. It is within this volume 14 that a bulb B is placed (FIG. 5) for use according to the invention.

It is an important feature of the invention that the volume 14 enclosed within envelope 13 is expandible in all directions, so that bulb B may, during burial in the earth, remain closely retained within volume 14 while at the same time growing in girth and height without being injured, stunted, or cut by a rigid and unyielding container. Thus, the individual turns 12a, 12b, 12c, 12d may have their pitch increased by urging in the upward and downward directions (as viewed in FIG. 1) by the bulb B, thus increasing the volume 14 in those directions. Also, the side wall turns 12a, 12b, 12c may have their individual or collective radii (FIG. 2) increased by growth of the bulb B in girth within any one or more of the portions of envelope 13 adjacent corresponding ones of turns 12a, 12b, 12c. Finally, the various turns may tilt to accommodate a bulb which grows in an asymmetric manner.

The power of growing plants to expand against restraints is well known, as evidenced by the power of roots to split rocks after having entered a small crack therein. Accordingly, a bulb B closely retained within the original or unstressed turns 12a, 12b, 12c will easily expand the turns in all directions by the mechanisms just described, to accommodate the volume 14 to its own growing outline. This feature of the invention has two important results. First, it is highly desirable that a bulb B be closely retained within envelope 13 when it is initially planted, so that the bulb is more securely positioned and cannot tilt or otherwise shift within the hole H (FIG. 5), and also so that the lateral dimensions of envelope 13 are kept as small as possible for the bulb in question, thereby allowing closer spacing of bulbs in rows or other arrangements in the earth. Second, the closely retained bulb B is for the first time closely retained during growth and without injury thereto, stunting theerof, or malformation of the outline thereof. The present invention provides the first means for attaining such a device.

A bulb B (FIG. 5) may be inserted through the upwardly open mouth defined by turn 12a and into the volume 14 within envelope 13, and the gardening device 10 may then be lowered into a hole in the earth indicated at a broken outline H in FIG. 5. The hole H will previously have been dug by the gardener either to the approximate depth to which he desires to insert the bulb B or to the exact depth, depending upon his tools. When the device according to the invention is employed, the diameter of the hole H may be smaller than was heretofore possible, because of the aforesaid close retention of bulb B within receptacle envelope 13. Because the holes may be smaller in diameter, they may be more widely spaced, and there will then be less danger of cave-in of a hole while digging the adjacent hole.

The upstanding portion 12 is provided with a series of spaced gradations 12e therealong, which may be formed as indentations in the outline thereof, as markings on the exterior thereof, or by other visible means. If the gardening device 10 is lowered into a hole H whose depth is not exactly known, or even if it is lowered into a hole whose depth was known when dug but into which some earth has fallen either from above or from the sides of that hole, the depth of the bottom of bulb B will be indicated by that one of gradations 12e which is just level with the ground level G (FIG. 5). The gardener is thus aided in rapidly setting out bulbs to the same depth, or to a known and predetermined depth. If, unknown to the gardener, some earth has collapsed into the bottom of the hole H, he will be so informed by the gradations 12e on upstanding portion 12, and he may remove the gardening device 10 in order to remove that additional earth from the bottom of hole H, or he may choose to leave the bulb in hole H because its depth as indicated by gradations 12e is satisfactory to him, or for other reasons.

During the subsequent growing period of bulb B a stalk or other form of plant stem will of course emerge from the upper portion of bulb B into the air above ground level G to produce foliage, flowers, or the like. When such a stalk or stem is produced as indicated in broken outline at S in FIG. 5, the upstanding portion 12 performs the additional function of providing a stake to which stalk or stem S may be lashed, as by a loop of string or wire indicated in broken outline at W in FIG. 5. Also during this period of growth, the bulb B is allowed to grow in any direction that is natural to it, without stunting or distortion, because of the already-described ability of the gardening device to expand in all directions in response to the growth of bulb B.

It will also be appreciated that the construction wherein turns 12a, 12b, 12c, 12d defiine the discontinuous walls of envelope 13, provides nearly 100% open space along envelope 13, i.e. less than 10% of the envelope 13 constitutes wire 11, the rest being open space. The root structure of the bulb B is thus virtually uninhibited in its ability to grow outwardly and downwardly. That is to say, there are virtually no portions of bulb B which are not in direct and unimpeded contact with the earth surrounding bulb B. This is a great advantage in fostering healthy, rapid, and prosperous growth of bulb B while in the earth.

After the stalk or stem S has died and withered away together with the foliage dependent thereon, the upstanding portion 12 will remain to signal the gardener that there is a bulb immediately thereunder. It is contemplated by the invention that the gardening device 10 will be colored in any acceptable color coding system so that the identity of the bulb B cradled thereby can be deduced when only the upstanding portion 12 is visible. Occasionally, even after a bulb B has been removed from the ground by gardening device 10, it cannot be identified by the gardener because it is dirty or stained, or because it has grown in a peculiar manner. In such cases, the aforesaid color coding assists in the identification of the bulb B after as well as before it is removed from the ground.

In order to remove the bulb B from the ground before, during, or after the foliage has appeared and disappeared, the upstanding portion 12 is grasped, e.g. manually, and is pulled upwardly with sufficient force to extract the bulb B from the ground against the frictional forces associated with such movement and against the rupturing forces associated with the severing of the root structure which may have developed from the bulb. A tool including appropriate means, e.g. an eyelet, may be employed to remove the bulbs B from the ground by passing the hooked portion 15 through the tool, e.g. through the eyelet, and employing the tool to withdraw the gardening device 10 with the bulb B upwardly out of the earth.

After the bulb B has been removed from the earth, it may be cleaned while still in the gardening device 10, or the earth clinging to the bulb may be allowed to remain. In either event, the bulb B need not be removed from the gardening device 10, and the gardening device with the bulb B therein may be hung in a storage bin or the like from a hook by curved portion 15 for storage until the next growing season, if so desired. In general, prior art devices did not provide close retention of the bulb because of the many problems discussed herein, but devices that did offer close retention, at the expense of those problems, also were unable to free a bulb that had grown appreciably, because such growth often causes protuberances through any available apertures, so as to interlock the bulb with the device. It is thus a feature of the invention that, if removal of the bulb B from receptacle envelope 13 is desired, this can easily be effected by expanding the turns 12a, 12b, 12c, 12d manually, thus freeing the bulb despite any protuberances which may have grown in its outline.

It will be appreciated that employment of the gardening device 10 allows the gardener to insert a bulb B into the gardening device 10 and to plant it and store it alternately through a plurality of successive growing seasons without removing the bulb B from the gardening device 10. When so employed, the gardening device 10 gives the new advantage that bulbs need not be handled and rehandled after each growing season, but rather than they can be guarded against misidentification and wasteful extra handling by leaving them in the same gardening device 10 during successive growing and storage periods. Thus, once a bulb B has grown somewhat while in the ground, e.g. in its first growing season, it accommodates the volume 14 to itself by urging the turns 12a, 12b, 12c apart vertically and also into greater radii laterally, and rather than removing the bulb B from the thus accommodated volume 14 after this growing season, the gardener will find it convenient to merely store the bulb B within the associated gardening device 10, to which it is now nicely adapted, until the next growing season. If protuberances do occur, threatening waste of growing energy, it is a feature that the bulb can also be removed from the gardening device and inserted into another gardening device having a larger normal receptacle envelope 13.

Referring now to FIGS. 3 and 4, a second embodiment of the gardening device 10 according to the invention is shown. The upstanding portion 12 is the same, and the general helical outline of turns 12a, 12b, 12c is also the same, with the result that envelope 13 and volume 14 is essentially the same as that shown in the first embodiment of FIGS. 1 and 2. The second embodiment of FIGS. 3 and 4 differs in that a plurality of kinks 16 are provided in the side wall turns 12a, 12b, 12c, there being provided approximately two kinks per turn. The kinks 16 each essentially lie along the surface of envelope 13, and are each directed in the generally downward direction therealong. The kinks 16 provide additional areas of restraint upon bulb B by turns 12a, 12b, 12c. That is to say, the kinks 16 serve to increase the scope of the grasping action of turns 12a, 12b, 12c upon bulb B, but without decreasing the aforesaid openness of this grasp, thereby increasing the security of bulb B within evelope 13 without taking anything away from the possibility of root structure development from bulb B. The kinks 16 also serve to increase the effective modulus of elasticity of wire 11, so that a smaller diameter wire may be employed in such a manner as to give the effect of a larger diameter wire.

It will be appreciated that other receptacle configurations may be employed which will provide the aforesaid benefits, including the important advantage of increase in volume 14 in all directions under the urging of the growth of bulb B. For purposes of economy, continuous wire configurations are preferred to other forms of expendable receptacles. The helical wire recptacles which have been shown are presently preferred, but other wire formations may be used. In general, any wire configuration traceable as a single line (not necessarily continuous) from one end thereof to the other to form the entire envelope 13, and which contains no unexpandable portions, i.e. portions which cannot move relative to one another, will provide expandability in the three mutually orthogonal directions necessary to accommodate the growth of bulb B. Thus, the wire 11 may, in addition to the embodiments shown, trace out a helical pattern reversing itself after each turn. It may also, by way of example, trace out a vertical pattern of loops each of which forms a portion of an overall lateral periphery. Now that the inventive principles have been pointed out, those skilled in the art will be able to give many additional embodiments to the invention, each of which will still practice the invention.

While the invention has been described with reference to presently preferred but merely illustrative embodiments, no limitation thereto is to be inferred. Various changes and re-arrangements of the portions thereof may be practiced by those skilled in the art without departing from the inventive principles.

What is claimed is:

1. A gardening device for indicating the location of a plant bulb, including during periods of growth underground, comprising:
    (a) a receptacle portion, including
        (i) discontinuous walls forming an envelope enclosing an inner volume for close retention of said bulb therein, said envelope being adapted to be buried with the bulb during planting thereof, each portion of said walls being resiliently movable in all directions so that said volume can be increased in all directions by outward growth of said bulb, and
        (ii) an upwardly open mouth for insertion of said bulb into said volume and withdrawal therefrom;
    (b) an upstanding portion extending above said mouth sufficiently far to project above the ground when the bulb is planted at the proper depth; and
    (c) a scale on said upstanding portion by which the depth of planting of the bulb may be measured.

2. A device for indicating the location of a plant bulb, comprising a single integral piece of elongated resilient material, including:
    (a) a first portion bent in a plurality of loops cooperating with one another to define a receptacle adapted to receive a bulb, each loop of said receptacle being resiliently movable so that the volume enclosed by the receptacle may increase to accommodate growth of the bulb, said receptacle having an open mouth at its upper end; and
    (b) a second portion extending upwardly from the receptacle sufficiently far to project above the ground when the bulb within the receptacle is planted at the proper depth, said second portion including a scale by which the depth of planting of the bulb may be measured.

3. A device as defined in claim 2, including indicating means on said second portion by which the variety of bulb in said receptacle may be identified.

4. A gardening device for closely supporting a plant bulb, including during periods of growth underground, comprising:
    (a) a receptacle portion, including
        (i) a continuous portion of wire in the general shape of a helix defining an envelope enclosing an inner volume for close retention of said bulb therein, each turn of said helix being resiliently movable in all directions so that said volume can be increased in all directions by outward growth of said bulb,
        (ii) a plurality of kinks formed in the turns of said helix, each kink lying essentially along the surface of said envelope, and
        (iii) an upwardly open mouth for insertion of said bulb into said volume and withdrawal therefrom ;and
    (b) an upstanding portion extending above said mouth.

5. A gardening device for closely supporting a plant bulb, including during periods of growth underground, comprising:
    (a) a receptacle portion, including
        (i) a continuous portion of wire in the general shape of a spiral helix defining an envelope enclosing an inner volume for close retention of said bulb therein, each turn of said spiral helix being resiliently movable in all directions so that said volume can be increased in all directions by outward growth of said bulb, (ii) a plurality of kinks formed in the turns of said helix, each kink lying essentially along the surface of said envelope, and (iii) an upwardly open mouth defined by the uppermost turn of said helix for insertion of said bulb into said volume and withdrawal therefrom; and (b) an upstanding portion extending above said mouth.

6. A gardening device for closely supporting a plant bulb, including during periods of growth underground, comprising:

(a) a receptacle portion, including (i) a continuous portion of wire in the general shape of a spiral helix defining an envelope enclosing an inner volume for close retention of said bulb therein, each turn of said spiral helix being resiliently movable in all directions so that said volume can be increased in all directions by outward growth of said bulb, (ii) a plurality of kinks formed in the turns of said helix, each kink lying essentially along the surface of said envelope, and (iii) an upwardly open mouth defined by the uppermost turn of said helix for insertion of said bulb into said volume and withdrawal therefrom; and (b) an upstanding portion extending above said mouth, formed from said continuous portion of wire.

References Cited

UNITED STATES PATENTS

| | | | |
|---|---|---|---|
| 1,272,318 | 7/1918 | Rodgers | 99—440 X |
| 1,323,543 | 12/1919 | Nurock | 99—440 |
| 2,394,192 | 2/1946 | Mann | 47—37 |
| 2,902,795 | 9/1959 | Heigl et al. | 47—58 |

FOREIGN PATENTS 153,047 7/1904 Germany.

ABRAHAM G. STONE, *Primary Examiner.*

R. CARTER, *Assistant Examiner.*